US012020918B2

(12) United States Patent
Kozlov et al.

(10) Patent No.: US 12,020,918 B2
(45) Date of Patent: Jun. 25, 2024

(54) SELF-CALIBRATION OF HIGH RESOLUTION MASS SPECTRUM

(71) Applicant: Micromass UK Limited, Wilmslow (GB)

(72) Inventors: Boris Kozlov, Manchester (GB); Vasiliy Makarov, Bar (ME); Keith Richardson, High Peak (GB)

(73) Assignee: Micromass UK Limited, Wilmslow (GB)

( * ) Notice: Subject to any disclaimer, the term of this patent is extended or adjusted under 35 U.S.C. 154(b) by 216 days.

(21) Appl. No.: 17/435,266

(22) PCT Filed: Mar. 2, 2020

(86) PCT No.: PCT/GB2020/050500
§ 371 (c)(1),
(2) Date: Aug. 31, 2021

(87) PCT Pub. No.: WO2020/178569
PCT Pub. Date: Sep. 10, 2020

(65) Prior Publication Data

US 2022/0148867 A1 May 12, 2022

(30) Foreign Application Priority Data

Mar. 1, 2019 (GB) ...................................... 1902780

(51) Int. Cl.
*H01J 49/00* (2006.01)
*H01J 49/40* (2006.01)

(52) U.S. Cl.
CPC ...... *H01J 49/0009* (2013.01); *H01J 49/0036* (2013.01); *H01J 49/406* (2013.01)

(58) Field of Classification Search
CPC ... H01J 49/0009; H01J 49/0036; H01J 49/406
(Continued)

(56) References Cited

U.S. PATENT DOCUMENTS

2006/0136158 A1* 6/2006 Goldberg ............ H01J 49/0036 702/76
2008/0203284 A1* 8/2008 Grothe, Jr. .......... H01J 49/0009 250/252.1
(Continued)

FOREIGN PATENT DOCUMENTS

CN 108987238 A 12/2018
GB 2536536 A 9/2016
(Continued)

OTHER PUBLICATIONS

International Search Report and Written Opinion for International Application No. PCT/GB2020/050500, dated May 27, 2020.
(Continued)

*Primary Examiner* — Michael Maskell
(74) *Attorney, Agent, or Firm* — Goodwin Procter LLP

(57) ABSTRACT

A method of self-calibrating a mass spectrometer or mass spectral data is disclosed. At least some first observed mass to charge ratios are matched with or against a comprehensive reference set of possible or predicted elemental compositions having known precise mass to charge ratios. One or more calibration parameters of a calibration routine are then adjusted so as to optimise the match between one or more of the first observed mass to charge ratios and the corresponding known precise mass to charge ratios of one or more possible or predicted elemental compositions contained within the reference set.

9 Claims, 6 Drawing Sheets

(58) Field of Classification Search
USPC .................................................. 250/281, 282
See application file for complete search history.

(56) References Cited

U.S. PATENT DOCUMENTS

| | | | | |
|---|---|---|---|---|
| 2013/0009052 A1* | 1/2013 | Grothe, Jr. | .......... | H01J 49/0009 250/282 |
| 2017/0032952 A1* | 2/2017 | Verenchikov | ....... | H01J 49/0031 |
| 2017/0125222 A1 | 5/2017 | Brown et al. | | |

FOREIGN PATENT DOCUMENTS

| | | | |
|---|---|---|---|
| JP | H11-260310 | A | 9/1999 |
| JP | 2006-177953 | A | 7/2006 |
| JP | 2010-529457 | A | 8/2010 |
| JP | 2014-515173 | A | 6/2014 |
| JP | 2017-103242 | A | 6/2017 |
| WO | 2006/130787 | A2 | 12/2006 |
| WO | 2013192161 | A2 | 12/2013 |

OTHER PUBLICATIONS

Combined Search and Examination Report for GB Application No. GB2002999.7, dated Aug. 11, 2020.

Wolski, W. E., et al., "Calibration of Mass Spectrometric Peptide Mass Fingerprint Data Without Specific External or Internal Calibrants", BMC Bioinformatics, BioMed Central, 6(1):1-17, Aug. 15, 2005.

Ledman, D. W., et al., "Water Cluster Calibration Reduces Mass Error in Electrospray Ionization Mass Spectrometry of Proteins", J. Am. Soc. Mass Spectrometry, vol. 8, pp. 1158-1164 (1997).

ISO 13084:2018, "Surface chemical analysis—Secondary ion mass spectrometry—Calibration of the mass scale for a time-of-flight secondary ion mass spectrometer", Available from: https://www.iso.org/standard/73133.html [ Accessed Aug. 20, 2019].

Examination Report for European Patent Application No. 20709304.8, mailed Jan. 31, 2024.

Roman-Hubers, A. T., et al., "Characterization of Compositional Variability in Petroleum Substances," Fuel, 317:123547 (2022).

* cited by examiner

SELF-CALIBRATION OF HIGH RESOLUTION MASS SPECTRUM

CROSS-REFERENCE TO RELATED APPLICATIONS

This application is a U.S. national phase filing claiming the benefit of and priority to International Patent Application No. PCT/GB2020/050500, filed Mar. 2, 2020, which claims priority from and the benefit of United Kingdom patent application No. 1902780.4 filed on Mar. 1, 2019. The entire contents of these applications are incorporated herein by reference.

FIELD OF THE INVENTION

The present invention relates generally to mass spectrometers and methods of mass spectrometry. Various embodiments are disclosed which relate to a method of self-calibrating high resolution mass spectral data and a mass spectrometer having a control system which is arranged and adapted to self-calibrate mass spectral data. In particular, various embodiments are disclosed wherein a mass spectrometer may be self-calibrated without utilising either intrinsic or extrinsic (lock mass) calibrants.

BACKGROUND

It is known to calibrate the mass to charge ratio scale of a mass spectrometer by fitting data from known ion peaks (reference standard(s)) to the underlying scan law employed by the mass spectrometer (such as a time of flight function). This calibration may be performed before, during or after the acquisition of an unknown analyte.

It is known to employ internal calibration methods wherein one or more known reference standard(s) are physically added to the analyte sample prior to ionisation of the sample. Accordingly, a mixture of both analyte sample and reference standard(s) is then ionised and mass analysed. As a result, both analyte ions and reference ions are generated and the calibration of the mass spectrometer can be adjusted based upon the detected known reference ions.

However, this known approach of adding one or more known reference standard(s) to an analyte sample can be problematic since the reference standard(s) need to be carefully selected such that when the reference standard(s) are ionised then the reference ions should be generated at a similar intensity to those of the unknown analyte ions in order to minimise or avoid saturation effects.

Another drawback of the approach of adding one or more known reference standards to a sample prior to ionisation is that the resulting reference ions need to have mass to charge ratios which are sufficiently different from the mass to charge ratios of analyte ions in order to avoid interference effects.

For these reasons, although methods of intrinsic calibration are well known they are rarely used in practice with modern instruments.

Adjustments to the calibration of a mass spectrometer are more commonly achieved using external calibration methods which are also referred to as using "lock mass(es)". External calibration methods involve having a separate reference substance which is periodically ionised and then mass analysed and wherein the calibration of the mass spectrometer is periodically adjusted so that the reference substance is determined to have the correct or precise mass to charge ratio after adjustment of the calibration routine.

External calibration or the use of lock mass ions refers to methods wherein the mass to charge ratio calibration of a mass spectrometer is corrected or adjusted at predetermined or periodic calibration time points. However, it will be appreciated that this approach relies upon (or assumes) the stability of the system between calibration time points. However, this approach can be problematic if short term perturbations occur to the components of the mass spectrometer. For example, the mass spectrometer may experience short term perturbations such as voltage drifts between calibration time points.

External calibration or lock massing also suffers from the problem that the use of lock masses increases the cost of the overall mass spectrometer since a separate dedicated ionisation source is normally provided to generate the reference standard or lock mass ions. It will be appreciated that the need to provide two separate ionisation sources (one for ionising the sample and a second for ionising the lock mass substance) increases the overall complexity of the mass spectrometer and undesirably increases the overall footprint of the instrument.

The approach of utilising an external calibration or lock mass also results in the requirement that the system needs to temporarily switch between the analyte and the reference standard which can cause a loss of analyte data. For example, if a lock mass is periodically ionised so that the calibration function of the mass spectrometer can be periodically corrected or adjusted then this may result in a corresponding periodic interruption of the acquisition of analyte data from the sample which can be problematic.

The known external calibration method may result in the mass spectrometer switching to perform a calibration check during an acquisition at predetermined times and this could coincide with a time when an analyte of interest may be eluting. An analyte of interest may, for example, be eluting or otherwise emerging from a liquid chromatography separation device which may be arranged upstream of an ionisation source. If an analyte of interest elutes at the same time that the instrument switches to perform a calibration check then it will be apparent that at least some potential analyte ions of interest will not be generated or detected and hence the conventional approach to correcting the calibration of the mass spectrometer can result in loss of analyte signal.

Ledman et al., *J. Am. Soc. Mass Spectrom.,* 1997, 8, pp. 1158-1164, discloses using a method of series of singly charged water molecule clusters as an external calibrant for a mass spectrometer.

ISO 13084:2018 discloses a method of external calibration of a mass spectrometer using a polycarbonate film. Methods of self-calibration are known wherein the mass to charge ratio calibration of the mass spectrometer is calibrated without reference either to internal or intrinsic calibrants (which may have been added to the sample prior to ionisation) and also without reference to external, extrinsic or lock mass ions. Such known methods of self-calibration require some element of prior knowledge or assumptions concerning aspects of a mass spectrum which is likely to be observed.

For example, for low-resolution mass spectrometers it is known to fit mass to charge ratio peaks by sequence of natural or whole numbers. In other words, mass peaks are assigned to the nearest nominal mass—for example, observed ions peaks may be assigned to mass to charge ratios 121, 122, 123 etc.

It will be understood, however, that such approaches are unsuitable for high resolution mass spectrometry wherein multiple ions peaks relating to different substances will be observed having the same nominal mass to charge ratio. For example, as is shown and will be described in more detail below with reference to FIG. 2, $C_7H_7O_2$, $C_6H_7N_2O$, $C_7H_9NO$ and $C_7H_{11}N_2$ all have the same nominal mass to charge ratio of 123 and have different precise mass to charge ratios within a narrow range of 123.04-123.09.

US2017/125222 (Micromass) discloses a method of self-calibration of mass spectra using differences in molecular weight from known charge states.

It is desired to provide an improved mass spectrometer and method of mass spectrometry and in particular it is desired to improve the calibration of high resolution mass spectral data and mass spectrometers.

SUMMARY

According to an aspect there is provided a method of self-calibrating a (optionally high resolution) mass spectrum (or mass spectral data) optionally obtained with preliminary calibration comprising:

generating a (comprehensive) reference set of theoretical mass to charge ratios corresponding to all (or numerous) possible elemental compositions consistent with one or more (specified or chemical) rules optionally over a restricted mass range or ranges; and matching preliminary mass to charge ratios of the mass spectrum with or against a reference set of elemental compositions so that a maximum number of mass spectrum peaks are fitted with expected precision to some elemental compositions from the set when one or more calibration parameters are adjusted.

The step of matching mass to charge ratios of the mass spectrum with or against a reference set of elemental compositions may comprise:

finding all the differences between every inaccurate mass to charge value of the mass spectrum and mass to charge values of the reference set of elemental compositions;

grouping found differences according to expected mass accuracy;

selecting the correct group; and adjusting one or more calibration parameters of a calibration routine so as to reduce the mass error between mass to charge ratios of the spectrum and the corresponding known precise mass to charge ratios of elemental compositions in the selected group.

The selection of the correct group may be based on: (i) the maximum number of entities in the group; and/or (ii) comparison of natural abundances of the sets of elemental compositions in groups.

The method may further comprise selection of the correct group by matching m/z peaks and elemental compositions by correlation of relative peak intensities and natural isotope abundances in the elemental compositions.

The method may further comprise selection of the correct group based on the fit coincidence between a predefined function and the calibration curve of the groups.

The high resolution mass spectrum may be acquired by a multi-reflecting Time of Flight mass analyser optionally utilising Encoded Frequent Pushing ("EFP").

According to an aspect there is provided a method of self-calibrating a mass spectrometer comprising:

ionising a sample to generate analyte ions;

mass analysing at least some of the analyte ions to determine first observed mass to charge ratios of the analyte ions;

matching at least some of the first observed mass to charge ratios with or against a reference set of possible or predicted elemental compositions having known precise mass to charge ratios; and adjusting one or more calibration parameters of a calibration routine so as to optimise the match (or reduce the mass error) between one or more of the first observed mass to charge ratios and the corresponding known precise mass to charge ratios of one or more possible or predicted elemental compositions contained within the reference set.

The method according to various embodiments enables the mass to charge ratio of analyte ions detected by a mass analyser to be determined with a high mass accuracy for all acquired mass spectra in spite of the fact that the mass spectrometer may be operating under conditions wherein various operational parameters may be floating or changing with time. For example, the mass spectrometer may be subjected to voltage fluctuations and ion-optical components of the mass spectrometer may experience slight changes in geometry due, for example, to thermal expansion effects. Also, the mass spectrometer may experience variations in the timings or frequencies of various outputs.

GB 2536536 A (Micromass) discloses a method of mass spectrometry comprising chromatographically separating a sample containing matrix components and one or more analytes. A library of matrix data is provided comprising physio-chemical properties as a function of retention time. One or more error values as a function of retention time are calculated based on a comparison between the sample data and matrix data, and these error values may be used to correct data relating to the analyte components. Micromass does not disclose using analyte ions for calibration, instead relying on known (or measured) properties of a known (or measured) matrix material.

WO 2006/130787 A2 (Cedars Sinai Medical Center) discloses a method of self-calibrating mass spectrums of peptides by iteratively assigning peaks and altering calibration parameters until a stable fit is achieved. It does not disclose generating a reference set of mass to charge ratios corresponding to all elemental compositions consistent with one or more specified rules over a restricted mass range as disclosed herein.

Wolski et al., *BMC Bioinformatics,* 2005, 6:203, pp. 1-17, discloses method of self-calibrating a mass spectrum by using a minimum spanning tree algorithm to align the spectrum with possible peak lists. It does not disclose generating a reference set of mass to charge ratios corresponding to all elemental compositions consistent with one or more specified rules over a restricted mass range as disclosed herein. The self-calibration approach according to various embodiments may be applied to mass spectral data on the fly or during the course of acquisition. According to other embodiments the self-calibration approach may be used in a post-processing method in order to retro-actively calibrate mass spectral data.

The method may be successfully used with internally consistent mass spectra without amplitude-dependent deviations of peak position due to detector features or space charge or image-charge effects since it relies upon simultaneous coincidence of all matched peaks when proper calibration coefficients are used.

The method according to various embodiments has particular utility in the self-calibration of multi-reflecting Time of Flight instruments and high resolution mass spectral data and particularly multi-reflecting Time of Flight instruments which utilise Encoded Frequent Pushing ("EFP").

According to various embodiments a method of de novo calibration of mass spectrometry data is disclosed which concerns or relates to the fitting of mass to charge ratio (m/z) values with an array, grid, set or table of mass to charge ratio (m/z) values which relate to a comprehensive set of (reference) elemental formulas or elemental compositions.

The method may comprise creating an array, grid, table or set of theoretical or reference mass to charge ratio (m/z) values of all potential elemental compositions which optionally are consistent with one or more known chemical rules. A high resolution mass spectrum or mass spectra of a priori unknown ion species may be obtained. Precise centroids of the ion peaks in the observed or experimental mass spectrum may then be found or determined and the match between the centroids of ion peaks with known elemental compositions having precisely determined mass to charge ratios may be optimised. In particular, the error intervals between observed ion peaks and the known (precise) mass to charge ratios of potential or predicted elemental compositions may be determined and one or more calibration parameters of the mass spectrum or of a calibration routine may be adjusted, corrected or optimised in order to reduce the error intervals and achieve a better fit between the experimentally observed mass spectral data and the theoretical or reference data.

The reducing of error intervals may take into account weights of the matches being a function of peak mass and amplitude.

The grid, array, table or set of known elemental compositions may be rarified, reduced or otherwise filtered by utilising preliminary known properties of the species in the mass spectrum and/or based upon known information relating to the analyte sample. For example, it may be known that the sample being analysed comprises an organic sample rather than an inorganic sample.

According to various embodiments low abundance isotopes may be omitted from the created grid, array, table or set of potential mass to charge ratio (m/z) values of elemental compositions which may be used as a reference set of possible or predicted elemental compositions.

The step of adjusting one or more calibration parameters of a calibration routine may further comprise adjusting one or more calibration parameters of a calibration routine so as to reduce the mass error (or mass to charge ratio error) between one or more of the first observed mass to charge ratios and the corresponding known precise mass to charge ratios of one or more possible or predicted elemental compositions contained within the reference set.

In particular, according to various embodiments many observed ion peaks especially in the low mass range (<300 Da) may be confidently matched to known or reference elemental compositions with a high level of confidence.

The reference set of possible or predicted elemental compositions may have a maximum (or upper limit) mass or mass to charge ratio selected from the group consisting of: (i) <100; (ii) 100-200; (iii) 200-300; (iv) 300-400; and (v) 400-500.

The above ranges may comprise mass to charge ratio units or mass units (Da). It will be understood that according to various embodiments the complexity of identifying observed ion peaks and confidently matching such ion peaks to predicted or possible reference elemental compositions becomes significantly easier if the mass or mass to charge ratio range is restricted to a low mass or mass to charge ratio range in which there are a limited (and computationally more manageable) number of potential elemental compositions.

The reference set of possible or predicted elemental compositions may comprise a reference set of possible or predicted organic molecules.

The method of self-calibration according to various embodiments is particularly useful in seeking to self-calibrate a mass spectrometer which is analysing an organic sample as opposed to an inorganic sample. It will be understood that with organic samples there will often be multiple different organic molecules which have the same nominal mass to charge ratio but which are separated from each by, for example, 0.01 mass to charge ratio units in high resolution mass spectral data.

The reference set of possible or predicted organic molecules may have a composition in the form $C_{n1}H_{n2}N_{n3}O_{n4}$.

It will be understood that organic molecules will normally comprise molecules which have the formula $C_{n1}H_{n2}N_{n3}O_{n4}$ and wherein n1, n2, n3 and n4 are integers. However, it will also be understood that there are various chemical rules which make some theoretically possible organic molecules more likely to be observed than others.

The self-calibration routine may take into account various chemical rules and may reduce the set of reference possible or predicted elemental compositions in order to aid the matching of observed ion peaks to reference compositions. For example, according to various embodiments the (chemical) rule $n1 \leq n2 \leq 2n1+2$ may be applied.

According to various embodiments the (chemical) rule $n3+n4 \leq 4N$, wherein N is 4, 5, 6, 7, 8, 9, 10, 11 or 12 may be applied.

The step of adjusting one or more calibration parameters may be made without reference to adding one or more intrinsic or internal calibrants to the sample.

The step of adjusting one or more calibration parameters may be made without reference to mass analysing one or more extrinsic or external calibrants or lock masses.

As discussed above, it will be understood that there are three main conventional approaches to calibrating a mass spectrometer. Firstly, there is the approach of adding internal calibrants to the sample prior to ionisation. Secondly, there is the approach of using an external lock mass to calibrate the sample. Thirdly, there is the approach of self-calibration wherein some degree of prior knowledge or assumption in respect of the sample or resultant mass spectral data is made.

It should be understood, that the approach according to various embodiments essentially relates to a secondary adjustment or correction of a mass spectrometer which may already been calibrated to a limited degree at least.

Accordingly, it is contemplated that an initial or primary calibration of the mass spectrometer may be performed using either an intrinsic or extrinsic calibrant. However, once the instrument has been initially calibrated then subsequent secondary adjustments or corrections to the calibration of the instrument may be performed utilising the self-calibration method which is disclosed according to various embodiments.

It should be understood, therefore, that a beneficial effect of implementing the method and apparatus according to various embodiments is that periodic lock mass calibration routines do not need to be performed in order to keep the instrument calibrated. Another important advantage is the possibility of self-calibration of every mass spectrum in spite of calibration drift between spectra during experiments and in the case of fast switching of acquisition between survey and MS-MS spectra.

The approach according to various embodiments does not exclude the possibility of performing intrinsic or extrinsic calibration at points during analysis of a sample of interest if this is desired or deemed beneficial. However, reliance upon intrinsic or extrinsic calibration methods can be significantly reduced or negated entirely. Furthermore, the time between periodic external lock mass calibration checks can be significantly increased and such periodic checks can be performed at times when there is a high level of confidence that such checks will not interfere with the acquisition of analyte sample data.

The method may further comprise removing from the reference set of possible or predicted elemental compositions one or more elemental compositions which are determined either: (i) to have or are likely to have a low or relatively low abundance; or (ii) to be relatively unlikely to be present in the sample.

It will be appreciated that even when an upper mass or mass to charge ratio limit of, for example, 300 Da is imposed upon the reference set of possible or predicted elemental compositions, then there could still be numerous (many thousands of) possible elemental compositions in the reference set. If however, some such elemental compositions are very rare in nature or are only likely to be observed at very low abundances or intensities, then such elemental compositions can be removed or otherwise filtered out from the reference set.

It is contemplated, for example, that the reference set of possible or predicted elemental compositions may be subdivided into two or more groups. A first group may comprise reference elemental compositions which are likely or highly likely to be observed and/or which are likely to be observed with a moderate or high intensity if present. A second group may comprise reference elemental compositions which are highly unlikely to be observed and/or which are likely to be observed with a very low intensity if present.

According to various embodiments the system may choose in certain circumstances just to use the first group of reference elemental compositions in order to reduce the complexity of matching observed ion peaks to reference ion peaks. In other circumstances, the system may include both the first group and the second group so that there is a greater number of possible or predicted elemental compositions in the reference set which is utilised.

The step of mass analysing the sample may comprise using a multi-reflecting Time of Flight mass analyser optionally utilising Encoded Frequent Pushing ("EFP").

The approach according to various embodiments is particularly suitable for high resolution mass spectral data and in particular for adjusting the calibration function of high resolution Time of Flight mass analysers. Multi-reflecting Time of Flight mass analysers which may optionally utilise Encoded Frequent Pushing ("EFP") are known and produce very high resolution mass spectral data. Accordingly, the method according to various embodiments is particularly suitable for such instruments.

According to another aspect there is provided a method of mass spectrometry comprising a method as described above.

According to another aspect there is provided a mass spectrometer comprising:

- an ion source for ionising a sample to generate analyte ions;
- a mass analyser for mass analysing at least some of the analyte ions to determine first observed mass to charge ratios of the analyte ions; and
- a control system arranged and adapted:
  - (i) to match at least some of the first observed mass to charge ratios with or against a reference set of possible or predicted elemental compositions having known precise mass to charge ratios; and
  - (ii) to adjust one or more calibration parameters of a calibration routine so as to optimise the match (or reduce the mass error) between one or more of the first observed mass to charge ratios and the corresponding known precise mass to charge ratio of one or more possible or predicted elemental compositions contained within the reference set.

The mass spectrometer may comprise a multi-reflecting Time of Flight mass analyser optionally utilising Encoded Frequent Pushing ("EFP").

According to an aspect there is provided a method of de novo calibration of mass spectrometry data comprising:

- (i) obtaining at least one peak detected mass spectrum containing no a priori known species;
- (ii) generating theoretical m/z values for all elemental compositions consistent with any specified rules over a restricted m/z range or ranges;
- (iii) determining possible matches between the theoretical m/z values and peaks in the mass spectrum; and
- (iv) adjusting a set of calibration parameters based on the matches.

The step of adjusting the set of calibration parameters which may be used to calibrate the analytical instrument, mass analyser or mass spectrometer may comprise choosing the calibration parameters to optimise based on a metric derived from the matches such as the number of peaks matched within the known precision of the peaks in the mass spectrum or spectra.

Alternatively, the calibration parameters of a calibration routine which may be used to calibrate the analytical instrument, mass analyser or mass spectrometer may be adjusted by choosing calibration parameters which optimise the likelihood of the mass spectral data given the calibration parameters and the set of possible matches.

According to other embodiments, the calibration parameters of a calibration routine which may be used to calibrate the analytical instrument, mass analyser or mass spectrometer may be adjusted by choosing calibration parameters which optimise the posterior probability of the calibration parameters given the data and the set of possible matches.

The matching criteria may be a function of peak mass and amplitude.

A weighted least square method may be used for fitting.

The grid, set, array or table of theoretical or predicted mass to charge ratio (m/z) values, masses or times of flight may be rarified or reduced by referring to preliminary known properties of the species in the mass spectrum.

According to various embodiments low abundance isotopes may be omitted from the created grid, set, array or table of potential mass to charge ratio (m/z), masses or times of flight values.

The mass spectrum or mass spectra may comprise high resolution mass spectral data or a high resolution mass spectrum or mass spectra which may be generated using an orthogonal acceleration Time of Flight mass spectrometer.

The calibration formula which may be used to calibrate the time of flight analytical instrument, mass analyser or mass spectrometer may be in the form:

$$m/z=a(t-t_0)^2 \qquad (1)$$

wherein m is the mass of the ion, z is the charge, t is the time of flight and a and $t_0$ are coefficients.

According to various embodiments the calibration formula may have one or two adjustable coefficients.

The mass spectrometer may comprise a multi-reflecting Time of Flight mass analyser which optionally may utilise Encoded Frequent Pushing ("EFP").

According to an aspect there is provided a method of mass spectrometry comprising:

mass analysing a sample using a mass spectrometer and determining first mass to charge ratios of analyte ions;

determining possible matches between the first mass to charge ratios and second predicted mass to charge ratios which correspond with a set, grid, table or array of possible or predicted elemental compositions which have mass to charge ratios within a first limited range; and optimising the match between the first and second mass to charge ratios, optionally by reducing mass errors between the determined first mass to charge ratios and corresponding second mass to charge ratios, in order to self-calibrate the mass spectrometer.

According to an aspect there is provided a mass spectrometer comprising:

a mass analyser for mass analysing a sample; and a control system arranged and adapted:

(i) to determine first mass to charge ratios of analyte ions;

(ii) to determine possible matches between the first mass to charge ratios and second predicted mass to charge ratios which correspond with a set, grid, table or array of possible or predicted elemental compositions which have mass to charge ratios within a first limited range; and (iii) to optimise the match between the first and second mass to charge ratios, optionally by reducing mass errors between the determined first mass to charge ratios and corresponding second mass to charge ratios, in order to self-calibrate the mass spectrometer.

BRIEF DESCRIPTION OF THE DRAWINGS

Various embodiments will now be described, by way of example only, and with reference to the accompanying drawings in which.

DETAILED DESCRIPTION

A conventional approach to mass calibration or self-calibration will first briefly be described with reference to FIG. 1.

Figure 1:
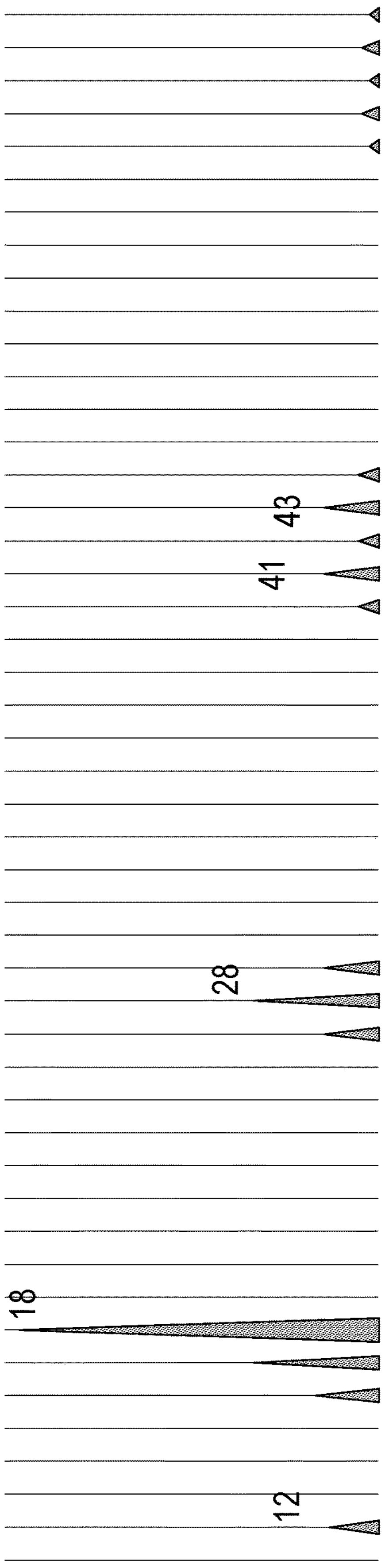
Fig. 1 Prior Art
FIG. 1 illustrates a state of the art whole-mass self-calibration approach.

FIG. 1 illustrates a conventional approach to mass calibration known as "whole mass" calibration wherein ion peaks are calibrated to the nearest whole or nominal mass unit. Due to the non-linear dependence of mass to charge ratio as a function of time of flight, proper fit can only be achieved for correct assignments of whole mass to charge values to the ion peaks. The inaccuracy of this method results from mass defects, namely that the masses of the observed ions are not precisely proportional to whole mass units (or 1/12 of the mass of carbon).

Figure 2:
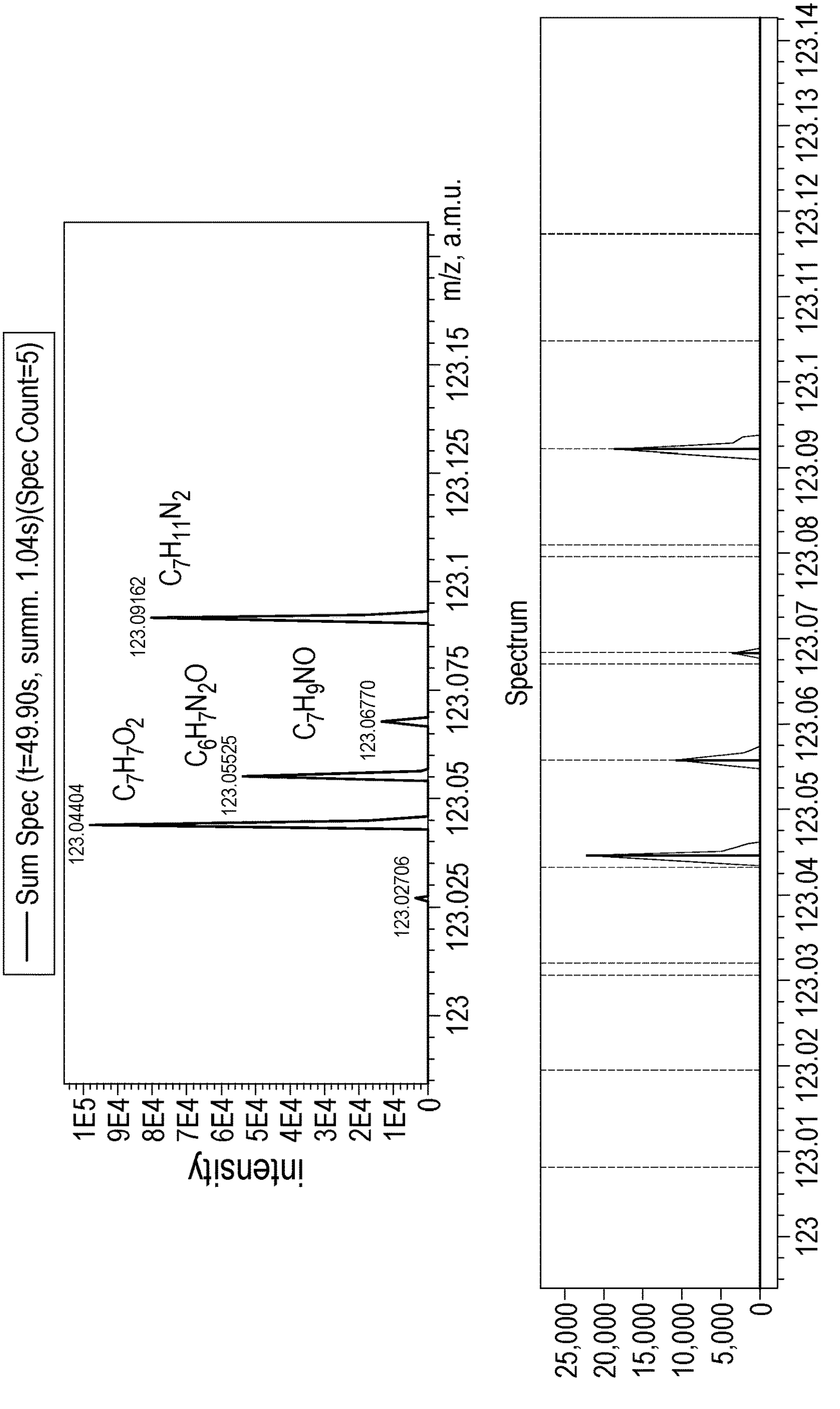
FIG. 2 shows multiple ion peaks each having the same nominal mass to charge ratio (123) wherein in the bottom figure the full height vertical lines indicate possible or predicted elemental compositions which together form a set of reference data and wherein the centroid of experimentally observed ion peaks is also shown and wherein the upper mass spectrum shows the observed mass peaks which have been assigned or matched with known elemental compositions following the application of the self-calibration routine according to various embodiments.

For comparison, FIG. 2 shows an example of high resolution mass spectrum fragment for a whole mass peak with mass to charge ratio m/z=123. On the bottom figure the full height vertical lines indicate an example of the new grid of precise positions of possible peaks, replacing the whole numbers grid of FIG. 1.

Various embodiments will now be described in more detail and relate generally to methods of self-calibrating of data and of an analytical instrument such as a mass analyser or mass spectrometer with high resolving power.

As will be discussed in more detail below, various embodiments relate to the correction or adjustment of a mass calibration correction, routine or function based upon internal properties of an acquired mass spectrum or mass spectra. In particular, an improved method of self-calibrating a mass spectrometer or mass spectral data is disclosed.

The method of self-calibrating the mass spectrometer or mass spectral data enables the mass error of the mass spectrometer or mass spectral data to be substantially reduced so that mass spectral data with high mass accuracy can be obtained.

An important aspect of the approach according to various embodiments is to generate a set of possible combinations of elements or possible elemental compositions optionally in a low mass range as a reference set for precise mass calibration of observed analyte ions from a sample.

The method according to various embodiments builds upon the fact that the potential number of elemental compositions in a restricted low mass range is relatively reduced or relatively low in number.

The method according to various embodiments affords a higher accuracy of mass calibration to be achieved compared with other known techniques since the method according to various embodiments takes into account the precise or accurate masses of a set of potential ions which may be observed.

The method according to various embodiments is particularly effective when a reasonably good conventional mass calibration routine is initially or first used to mass calibrate the instrument. The approach according to various embodiments may be applied to mass spectral data which has initially been calibrated in a conventional manner and allows a yet further improvement in mass calibration and correction of calibration drift during a measurement to be achieved which goes beyond the effectiveness of conventional mass calibration routines. However, it is not essential that the method of self-calibration according to various embodiments is applied to mass spectral data which has already been calibrated in a conventional manner. Accordingly, in many cases the method of self-calibration according to various embodiments may be applied to mass calibrate mass spectral data without any prior calibration having been performed.

The method of self-calibration according to various embodiments may build upon, extend or otherwise improve existing known calibration routines or methods. For example, the original accuracy of observed ions using a known calibration routine may be in the range of ±50 ppm. The method of self-calibration according to various embodiments may be used to correct or further improve the mass accuracy to <1 ppm by using only masses available in the mass spectrum and without utilising internal or external reference masses.

According to various embodiments measured mass to charge ratio (m/z) values of ions observed in a low mass range (which may, for example, correspond with ions having a mass ≤300 Da) may be fitted with or against a grid, array, table or set of all possible or likely elemental compositions which might be expected to be observed in this restricted mass range. The set of possible or likely elemental compositions may comprise a reference set of elemental compositions together with their precise or accurate known mass to charge ratio.

The grid, array, table or set of all possible or likely elemental compositions may be formed in a manner consistent with rules which may, for example, restrict various combinations of allowed elements and/or which may, for example, only permit probable or likely combinations of such elements. Ions which may theoretically exist but which are highly unlikely to be observed in normal circumstances may be excluded from the grid, table, array or set of possible or likely elemental compositions which are used for self-calibration purposes. Accordingly, highly unlikely elemental compositions may be excluded from the reference data set.

In practical implementations, some experimentally measured peaks may have elemental compositions which are not accounted for in the used set, array, table or grid of elemental compositions. Rare isotopes of elements may be omitted.

The method according to various embodiments may consist of two steps: (i) finding matching pairs of grid, array, table or set values and spectral peak positions by optimisation of one or more figures of merit that quantifies coincidence between the peaks and the grid, array, table or set of possible elemental compositions or values; and (ii) then using the matched pairs to determine new calibration coefficients or to adjust existing calibration coefficients of a calibration curve. It will be understood that the calibration coefficients may relate to a polynomial calibration curve which links the observed time of flight of ions in a mass analyser to a precise mass to charge ratio.

The definition of a figure of merit may vary or alter at different stages of the method of application. The definition of a figure of merit may vary for different pairs depending upon the intensity of corresponding peaks and/or the mass to charge ratio of corresponding peaks.

As an example, the first step of finding coincident pairs may be performed by following the following procedure. Firstly, the distances of experimentally observed ion peaks to all grid, array, table or set values may be determined utilising a wide tolerance according to the known variation of the instrument accuracy. For example, an error margin of ±50 ppm may be allowed for.

Next, the distributions of distances may be plotted or otherwise calculated and the matches with the most probable distance between experimentally observed values and theoretical grid, array, table or set values for each of these mass ranges may be determined.

Figure 5:
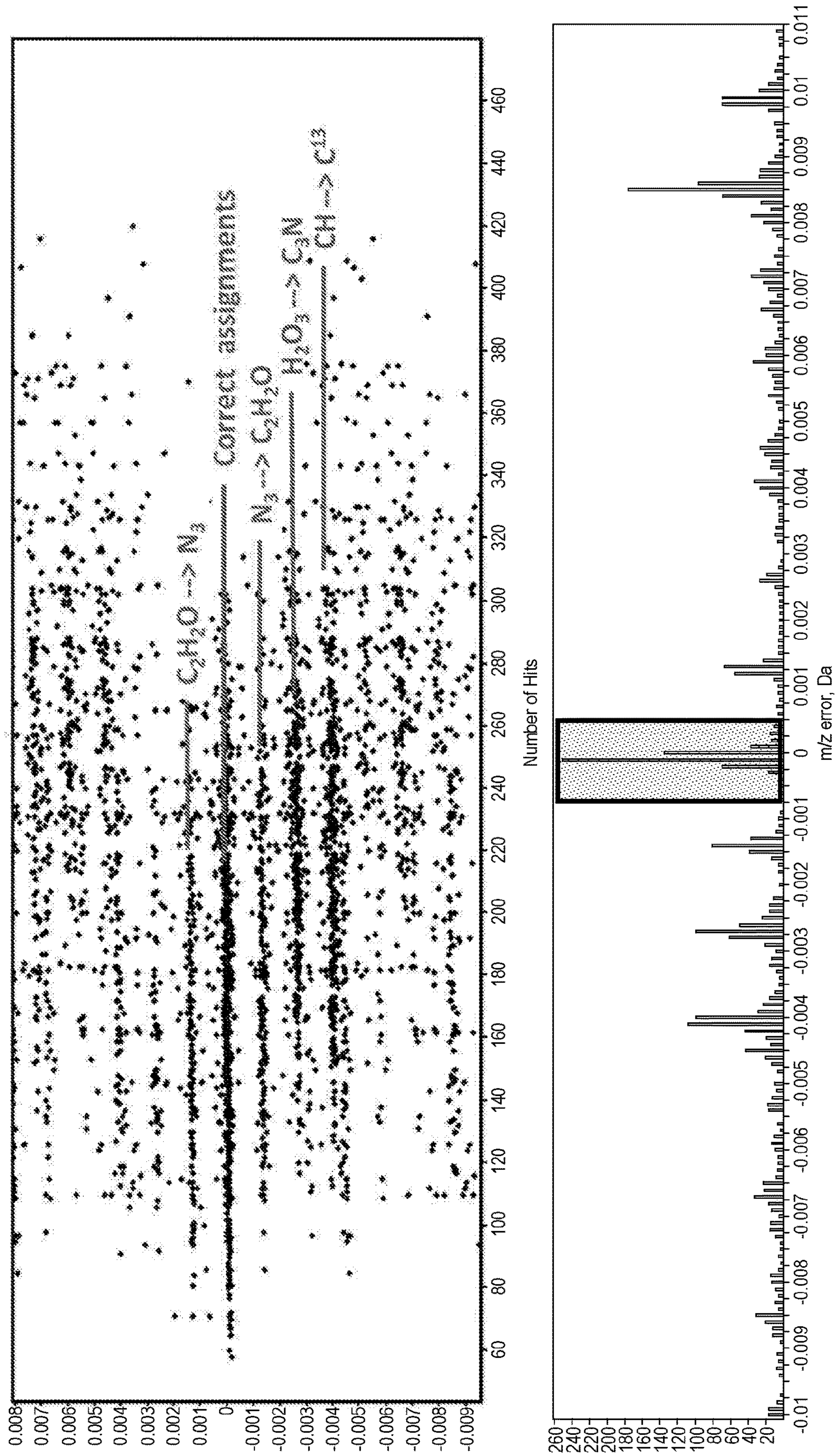
FIG. 5 shows an example of assignments of groups of deviations to be excluded on a basis of known mass defects of chemical groups, wherein the correct assignment could also be made by comparison of the number of points in the groups and wherein the bottom figure shows the density of peak-grid distances wherein the highlighted square shows the correct maximum representing assignments for further fitting.

The distribution of distances forms groups or clusters with different populations, as can be seen from FIG. 5.

False groups and clusters of distance distribution may be formed due to exchange of some frequent group of element by another group having close or similar molecular weights. The correct group is preferably more populated due to presence of all variations in contrast with false groups that are derived from the correct group having particular elemental fragment(s).

Selection of the correct group may be based first of all on the maximum number of entities in the group, as compared with other groups.

In some cases a false group may have the same number of entities as the correct group. For example, almost all organic molecules have one carbon and a couple of hydrogen atoms. If all correct matches of elemental composition $CH_2$ are substituted with N, then a group of distances shifted by 12.6 mDa from the correct one will be obtained. If the original spectrum contains only peaks of organic molecules, then the false group will have the same number of matches. In such cases additional selection based on comparison of chemical probability of elemental compositions may be applied. In the case of $CH_2$— N substitution all elemental compositions of the false group will have at least one atom of nitrogen.

In some embodiments, selection of the correct group may additionally or alternatively be based on choosing the group based on the fit coincidence between a predefined function and a calibration curve of the groups. In some embodiments, the calibration curve may be a Δm vs m plot or a Δm/z vs m/z plot. For some mass spectrometers, the correct group will give a linear fit. If a false group is chosen the fit will be slightly parabolic. Therefore if a parabolic fit is applied to potential groups, the correct group can be identified as the group with minimal absolute value of the second derivative.

Other instruments may have originally deviated calibration curves, and so in other embodiments the correct group may be selected as the group having known values of the fitting curve parameters.

Other approaches in relation to the selection of the correct group of matches may be based on known methods of analysis of isotopic pattern(s) of a chosen match with relatively small molecular weight. Then, for example, for organic molecules the number of carbon, oxygen and nitrogen atoms in the species can be estimated from the shifts and amplitudes of second and other isotope peaks. However, this approach is less preferable.

In order to avoid wrong assignments it is desirable to include all (or nearly all) possible peak values into the grid, array, table or set of possible elemental compositions. Including all (or nearly all) possible peak values into the grid, array, table or set of possible elemental compositions increases the likelihood of being able to construct, generate or otherwise determine a reasonable target calibration function which will have an optimal value in terms of correct fitting with experimental data. An initial preliminarily calibration using conventional calibrations methods may be of assistance but is not essential.

Additional checks for known widespread isobaric mass shifts can be applied to avoid false local optima. Known wrong optima can be identified by the value and sign of any mass defect, by the presence of corresponding isotopes or by other methods. Wrong optima may be excluded from the self-calibration process.

The method according to various embodiments may then attempt to minimise the determined distances by adjusting the calibration coefficients of a calibration curve, function, polynomial or routine connecting mass to charge ratio with the scanning parameters of the mass spectrometer (such as time of flight, frequency, voltage, amplitude or other parameter).

According to an embodiment the calibration coefficients may correspond with a calibration curve or function which may be described by a polynomial function or equation wherein the calibration curve or function may be applied to experimentally obtained mass spectral data in order to adjust the mass to charge ratio of detected or otherwise experimentally observed ions.

The range of matches between observed analyte ions and the grid around the most probable distance may be shrunk or otherwise reduced according to the dispersion of the distance distribution. Only these matches are used for further adjustments.

The next stage of the optimisation process of fitting the mass to charge ratio of observed analyte ions to potential elemental compositions may be made by utilising a least squares method. However, other embodiments are also contemplated wherein the optimisation process may seek to fit the mass to charge ratio of observed analyte ions to potential elemental compositions in a different manner. For example, the optimisation process may seek to fit the mass to charge ratio of observed analyte ions to potential elemental compositions on the basis of a gradient method, a simplex method or an alternative method of finding the maximum of a target function.

The two stages of finding correct pairs and then seeking to minimise the distances may be combined so that they are performed in a single step.

The target function may be based upon maximizing the number of fitted peaks and minimizing the distance between peaks and grid values. An example of such a function for a Time of Flight mass spectrometer is given by:

$$f(a_0, t_0) = \frac{\Sigma_n \frac{d(m_n(a_0, t_0))^2}{A_n}}{n\sqrt{n}} \quad (2)$$

wherein $a_0$ and $t_0$ are calibration coefficients to be varied in order to minimize the function, n is the number of peaks, $A_n$ is the amplitudes of the peaks and $d(m_n)$ is the difference between the peak and the closest grid, array or set of mass to charge ratio (m/z) values.

In order to check the method, a grid of all possible combinations of organic molecules having the general formula $C_{n1}\ H_{n2}N_{n3}O_{n4}$ within a limited mass range was considered in respect of mass spectra which related to the LC-MS analysis of urine samples. The eluting analyte ions were subjected to $MS^e$ and the resulting mass spectra were self-calibrated.

In order to reduce the number of potential elemental compositions the following restrictions were applied namely that firstly, $n1 \le n2 \le 2n1+2$, and that secondly, $n3 \le 4$ and $n4 \le 4$. Peak amplitudes were ignored. Furthermore, isotope peaks were also ignored.

Figure 3:
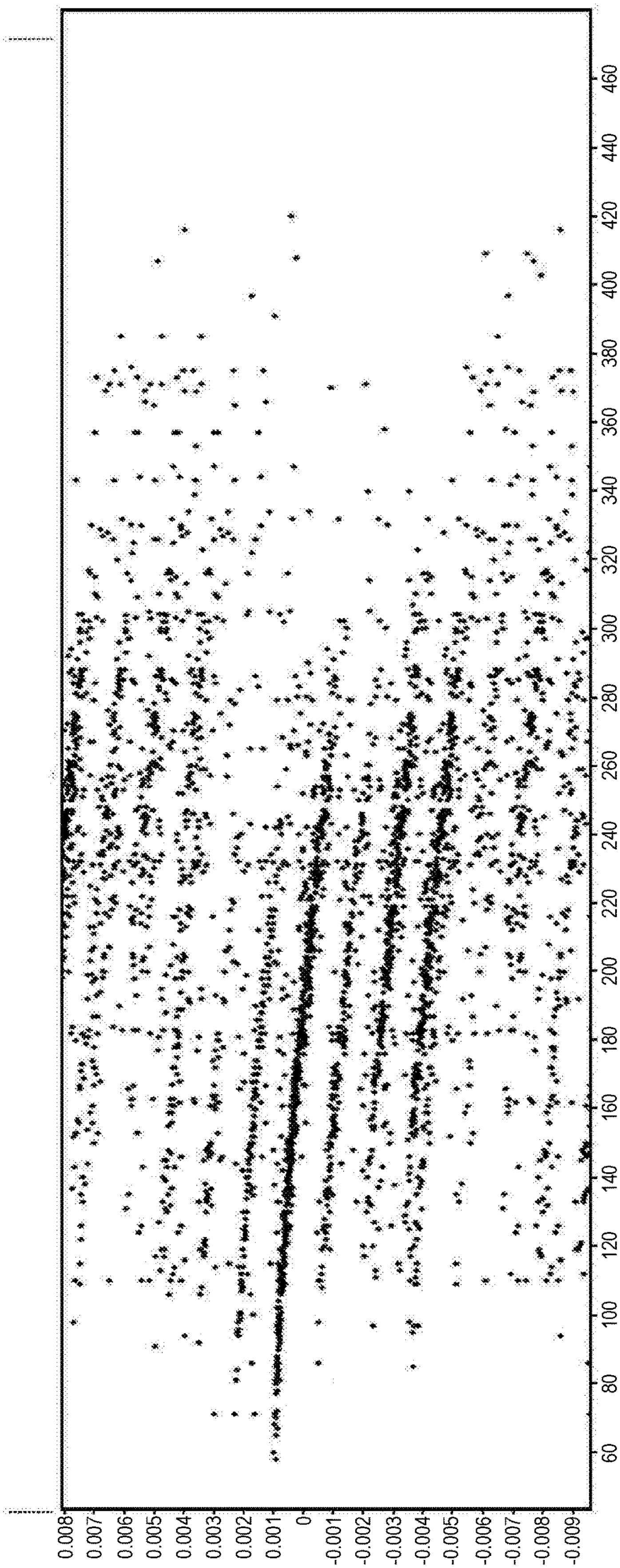
FIG. 3 shows a plot of all deviations or mass shifts (y axis, Da) between the mass to charge ratio of observed ion peaks (x axis, Da) and all mass to charge ratios of possible or predicted elemental compositions in a set of reference elemental compositions lying in a ±10 mDa range, prior to correction according to various embodiments.

FIG. 3 shows the observed peak shifts of analyte ions relative to the closest grid, array, table or set of possible elemental compositions in a reference set prior to self-calibration correction according to various embodiments.

Figure 4:
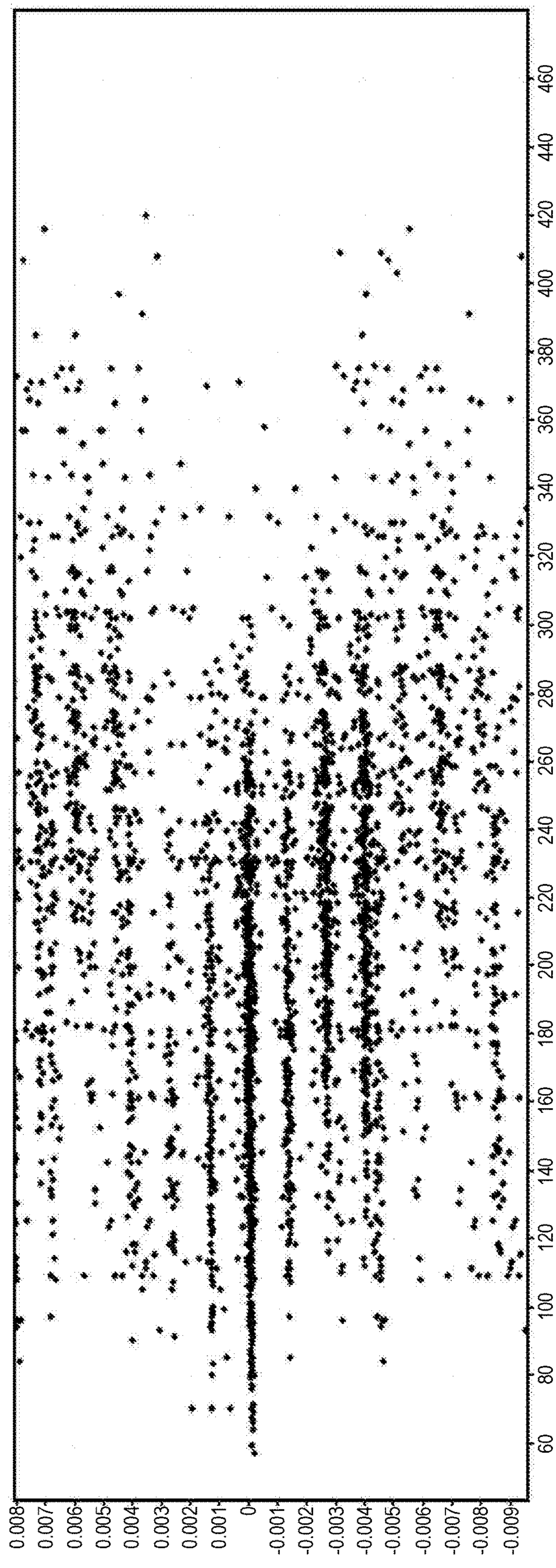
FIG. 4 shows a plot of all deviations or mass shifts from possible elemental compositions (y axis, Da) as a function of the mass to charge ratio of observed ion peaks (x axis, Da) after correction or adjustment of calibration coefficients according to various embodiments.

The mass spectral data was then processed in order to self-calibrate the mass spectral data in a manner according to various embodiments and FIG. 4 shows the resultant ion peak shifts relative to the grid, array, table or set points of reference data after correction according to various embodiments. In particular, it may be estimated from FIG. 4 that numerous ions ion the mass to charge ratio range 60-220 now have a mass error<<1 ppm.

It will be apparent, therefore, that the self-calibration approach according to various embodiments results in a substantial improvement in mass accuracy such that the mass error of many observed ions is now reduced <1 ppm which represents a significant improvement relative to conventional methods of adjusting the calibration of a mass spectrometer or calibrating mass spectral data.

According to various embodiments the intrinsic species of a sample may be present either for a large proportion of the experiment or alternatively the intrinsic species may elute from a separation device or be otherwise separated according to a separation technique such using as a liquid chromatography ("LC") column such that the observed analyte ions are observed or are otherwise present to be mass analysed over or during a relatively short period of time.

According to various embodiments the analytical instrument which may be used to analyse the sample may comprise a mass analyser or mass spectrometer. The instrument may further comprise a chromatography or other separation device which may, for example, be arranged upstream of an ion source.

The chromatography or other separation device may comprise a liquid chromatography or a gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion source which may be used to generate analyte ions may be selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; (xxix) a Surface Assisted Laser Desorption Ionisation ("SALDI") ion source; and (xxx) a Low Temperature Plasma ("LTP") ion source.

The analytical instrument may further comprise: (i) one or more ion guides; (ii) one or more ion mobility separation devices and/or one or more Field Asymmetric Ion Mobility Spectrometer devices; and/or (iii) one or more ion traps or one or more ion trapping regions.

Ions generated by the ion source may be fragmented using a collision, fragmentation or reaction device optionally located within the analytical instrument, mass analyser or mass spectrometer.

The collision, fragmentation or reaction device may comprise any suitable collision, fragmentation or reaction device. For example, the collision, fragmentation or reaction device may be selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

Further experimental data will now be described.

For example, if a liquid chromatography mass spectrometry ("LC-MS") experiment is performed then the set of possible elements or likely elemental compositions may be arranged to correspond with a set of organic molecules having the form or formula $C_{n1}$ $H_{n2}N_{n3}O_{n4}$ wherein the coefficients n1, n2, n3, and n4 correspond with reasonable or likely values. It will be understood from organic chemistry that with molecules of the CHNO system then some combinations of elements are more likely to occur than others.

The number of values in the grid, array, table or set of possible elemental compositions which may be included in the reference data set may exceed the number of measured mass to charge ratio (m/z) values by several orders of magnitude and hence the number of potential elemental compositions may be reduced according to various rules. For example, according to an embodiment a reference data set comprising approximately 3000 different combinations of organic molecules having the form or formula $C_{n1}$ $H_{n2}N_{n3}O_{n4}$ and having a mass <300 Da may initially be generated. This set of potential organic molecules may be further reduced or restricted to exclude organic molecules which are unlikely to be observed or which if observed are likely only to have a relatively low intensity.

FIG. 3 shows a plot of deviation or mass shift (y axis, Da) from the set of elemental compositions described above prior to correction as a function of the mass to charge ratio of observed ion peaks (x axis, Da).

FIG. 4 shows a plot of deviation or mass shift (y axis, Da) from the set of elemental compositions after correction according to various embodiments as a function of the mass to charge ratio of observed ion peaks (x axis, Da).

The correction was made by adjusting coefficients a and $t_0$ in calibration function (Eqn. 1) to get the distribution of correct group of mass shifts (distances between correct matches) sharp and centred at zero.

The upper figure of FIG. 5 shows both correct assignments and also assignments of false optima of calibration fits. The lower figure of FIG. 5 shows the resulting density of peak-grid distances with correct peaks centred at zero.

A square is shown in the lower figure of FIG. 5 which shows the correct group representing assignments for further fitting.

Figure 6:
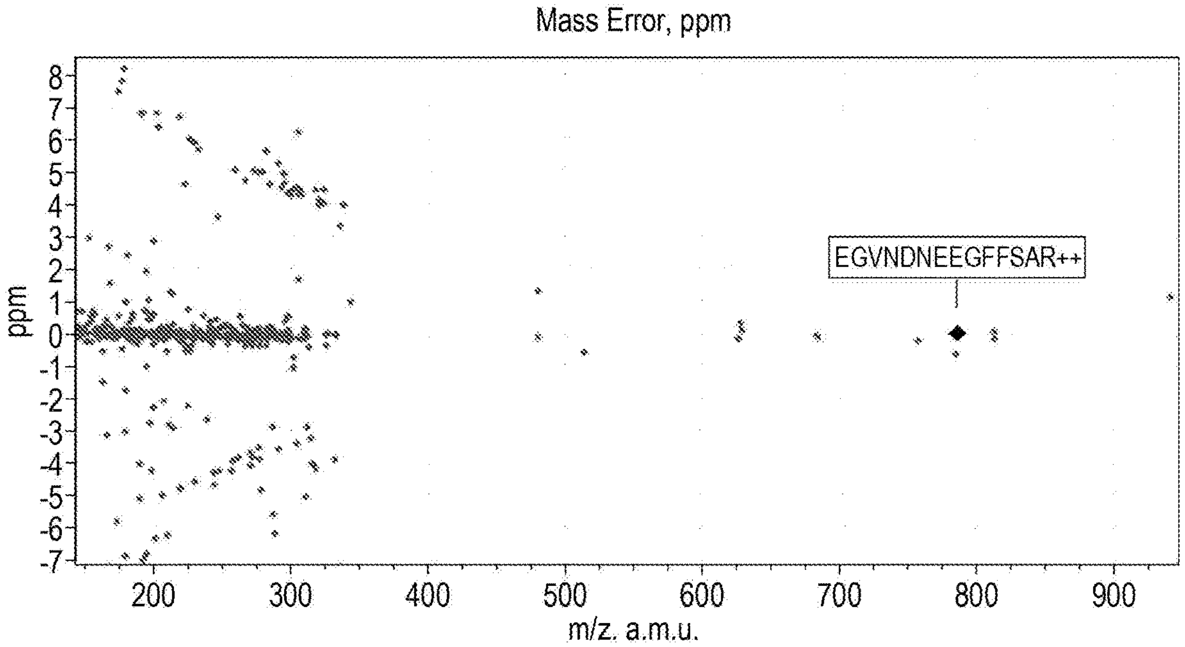
FIG. 6 illustrates how according to various embodiments of the present invention the mass spectrometer may be self-calibrated on the basis of matching observed and reference ions in a relatively low mass or mass to charge ratio range (for example, <300 Da) and wherein the effect of the self-calibration in the low mass range has a prolonged or extended effect so as also to calibrate ions having higher masses or mass to charge ratios and wherein, in particular, doubly charged glufibrinopeptide ions (EGVNDNEEGFFSAR++) which have a mass to charge ratio of 785.842 are observed precisely (that is with a mass error less than 0.1 ppm) at the correct mass to charge ratio when the mass spectrometer has been self-calibrated according to various embodiments.

FIG. 6 illustrates the effectiveness of the self-calibration method according to various embodiments.

In particular, FIG. 6 illustrates that the mass spectrometer may be self-calibrated by comparing observed ions in a low mass or mass to charge ratio range (for example, <300 Da) against reference data having a similar low mass restriction.

The effect of self-calibrating the mass spectrometer using low mass data is shown to be particularly effective across a wider or higher mass range. In essence, the self-calibration method has an effect which prolongs or extends the accurate calibration to ions having higher masses or mass to charge ratios.

In order to illustrate how the calibration is extended to higher masses, a doubly charged glufibrinopeptide ion (EGVNDNEEGFFSAR++) having a mass to charge ratio of 785.842 is observed with better than 0.1 ppm precision.

It is apparent, therefore, that the approach according to various embodiments is particularly beneficial and represents a significant advance in the art.

Various refinements may be made to the general self-calibration method according to various embodiments.

For example, according to various embodiments observed analyte ion peaks may be excluded from the mass spectrum or mass spectral data set which is utilised for self-calibration purposes based on information such as the intensity of the observed analyte ions, saturation effects which may distort some of the observed mass spectral data or interference flags in relation to the observed mass spectral data.

The self-calibration method may be extended to consider one or more isotope patterns of either predicted elemental compositions and/or observed analyte ions. Isotope patterns or isotopic ratio verification may be used to for selection of correct matches or correct group of matches.

As discussed above, rules may be referred to in order to constrain possible elemental compositions and reduce the number of possible, likely or potential elemental compositions which may be expected to be observed and which be used for self-calibration purposes. The rules which may be used may be general rules which may be applied without any prior knowledge of the sample or the experimental set up.

Alternatively, one or more rules which may be used may utilise knowledge of the sample and in particular the sample type such as whether or not the sample being analysed is likely to be an organic or inorganic substance.

The rules which may be applied may take account of the fact that the instrument set-up involves utilising a separation device such as a liquid chromatography or gas chromatography separation device.

If it is known in advance that a liquid chromatography separation device is used or is likely to be used then the rules may take into consideration the nature of one or more solvents which are used or which are likely to be used. In a similar manner, the rules may take into consideration the solvent gradient which is used or which is likely to be used. For example, assuming that a solvent gradient is used in conjunction with a liquid chromatography separation device then a prediction may be made that certain elemental compositions will only, most likely, be observed at certain elution times or that such elemental composition are likely to have a retention time within a certain range.

The rules which may be applied may also take into account likely impurities, such as salts, which may be expected to be observed. For example, analyte ions which are identified as comprising impurities such as salts may be excluded from the mass spectral data which is used for self-calibration purposes.

If the sample is known or expected to relate to a biological sample then account may be made for the expected presence of peptides, lipids or the like in the sample.

Methods of de novo calibration such as PepLock™ may be used to get a reasonable initial calibration and the calibration may then be further improved by applying a method of self-calibration in a manner as discussed in more detail above.

The method of self-calibration may be applied at the start of an experiment and the subsequently obtained mass spectral data may rely on this initial calibration.

Other embodiments are also contemplated wherein the method of self-calibration may be applied retro-actively to experimental data in a post-processing step as determined by the method of self-calibration as described above.

Yet further embodiments are contemplated wherein the method of self-calibration may be repeatedly applied or performed during an experimental acquisition. For example, embodiments are contemplated wherein a self-calibration method according to various embodiments may be used frequently or even continuously during an experiment, experimental run or acquisition in order to update, check, confirm, re-confirm or improve an existing calibration or calibration function, polynomial or routine.

Self-calibration may be applied to every mass spectrum separately or prolonged between spectra.

Prolongation of the calibration parameters may be applied or utilised to the spectra obtained between one or more calibrations according to the self-calibration method according to various embodiments. For example, a self-calibration method may be applied to initial survey spectra or survey mass spectral data. The calibration parameters which are then determined may then be applied to subsequent MS or MS-MS data so that prolongation of calibration parameters may be applied to MS or MS-MS spectra.

Self-calibrated spectra which are close in time of acquisition may be expected to have close calibrations. Using the calibration found for the previous spectrum is preferred as a start for self-calibration of the next spectrum. Outliers in the time sequence of calibration parameters may be rejected or reconsidered.

Ion peaks which are identified with reference to potential elemental compositions according to the self-calibration method may be stored for future or subsequent use in calibration or calibrating during the same or subsequent experiments.

The self-calibration method may be yet further extended to take into consideration potential multiple candidate charge states. The grid, array, table or set of potential or expected charge states considered may depend on the elemental composition of the candidate elemental composition.

Uncertainties may be determined for the calibration parameters. For example, a polynomial calibration function may be determined and a corresponding uncertainty or one or more error bars for the determined calibration function may be determined.

It will be apparent that the method of self-calibration is particular effective within the restricted mass, mass to charge ratio or time of flight range which may be imposed upon the initial matching. For example, the method of self-calibration may be performed upon observed analyte ions having a mass <300 Da.

The calibration function, polynomial or routine may then be extended across a wider mass, mass to charge ratio or time of flight range. For example, extrapolation of the calibration or calibration correction may be applied in order to extend the calibration outside or beyond the restricted mass, mass to charge ratio or time of flight range which was initially used in matching. The extrapolation of the calibration function beyond the initial mass, mass to charge ratio or time of flight range may be constrained by one or more known or previously characterised instrument behavior(s).

The proposed approach may be used with all kinds of high-resolution mass spectrometers with good internal consistence of mass spectra. In particular, the method of self-calibration according to various embodiments as discussed above is particularly applicable to multi-reflecting Time of Flight analysers which may optionally utilise Encoded Frequent Pushing ("EFP") and the resulting mass spectral data sets which are obtained from such instruments.

The method and apparatus according to various embodiments allows high mass accuracy to be achieved for all acquired mass spectra in spite of the fact that the analytic instrument, mass analyser or mass spectrometer may experience various floating or fluctuating parameters. For example, as discussed above the analytical instrument, mass analyser or mass spectrometer may experience fluctuations in voltages, effective geometry, frequencies or timer outputs. Furthermore, the instrument may generate ions without introducing any known external standard compounds. Optionally, the instrument may not make any reference to either external or internal references or calibrant ions.

The method according to various embodiments can be applied on the fly to every acquired spectrum, to data acquired during some stages such as survey scans or periodically during acquisition. Alternatively and/or additionally, the self-calibration method may be applied a posteriori.

The self-calibration method according to various embodiments may be successfully used with reference only with internally consistent mass spectra and without amplitude-dependent deviations of peak position due to detector features, space charge or image-charge effects.

Although the present invention has been described with reference to preferred embodiments, it will be understood by those skilled in the art that various changes in form and detail may be made without departing from the scope of the invention as set forth in the accompanying claims.

The invention claimed is:

1. A method of self-calibrating a mass spectrum comprising:

generating a reference set of theoretical mass to charge ratios corresponding to all possible elemental compositions consistent with one or more specified rules over a mass range or ranges; and matching preliminary mass to charge ratios of the mass spectrum with the reference set of elemental compositions so that a maximum number of mass spectrum peaks are fitted with expected precision to some elemental compositions from the set when one or more calibration parameters are adjusted;

wherein the step of matching mass to charge ratios of the mass spectrum with the reference set of elemental compositions comprises:

finding all the differences between every inaccurate mass to charge value of the mass spectrum and mass to charge values of the reference set of elemental compositions;

grouping found differences according to expected mass accuracy;

selecting a correct group, where the selection of the correct group is based on: (i) the maximum number of entities in the group; and/or (ii) comparison of natural abundances of the sets of elemental compositions in groups; and adjusting one or more calibration parameters of a calibration routine so as to reduce the mass error between mass to charge ratios of the spectrum and the corresponding known precise mass to charge ratios of elemental compositions in the selected group.

2. A method as claimed in claim 1, wherein the reference set of elemental compositions comprises a reference set of possible or predicted organic molecules.

3. A method as claimed in claim 2, wherein the reference set of possible or predicted organic molecules have a composition in the form $C_{n1}H_{n2}N_{n3}O_{n4}$.

4. A method as claimed in claim 3, wherein $n1 \leq n2 \leq 2n1+2$.

5. A method as claimed in claim 2, wherein $n3+n4 \leq 4N$, wherein N is 4, 5, 6, 7, 8, 9, 10, 11 or 12.

6. A method as claimed in claim 1, further comprising removing from the reference set of elemental compositions one or more elemental compositions which are determined either: (i) to have or are likely to have a low or relatively low abundance; or (ii) to be relatively unlikely to be present in the sample.

7. A method of mass spectrometry comprising a method as claimed in claim 1.

8. A mass spectrometer comprising:

an ion source for ionising a sample to generate analyte ions;

a mass analyser for mass analysing at least some of the analyte ions to generate a mass spectrum; and a control system arranged and adapted:

(i) to generate a reference set of theoretical mass to charge ratios corresponding to all possible elemental compositions consistent with one or more specified rules over a mass range or ranges; and (ii) to match preliminary mass to charge ratios of the mass spectrum with the reference set of elemental compositions so that a maximum number of mass spectrum peaks are fitted with expected precision to some elemental compositions from the set when one or more calibration parameters are adjusted;

wherein the control system is configured to match mass to charge ratios of the mass spectrum with the reference set of elemental compositions by:

finding all the differences between every inaccurate mass to charge value of the mass spectrum and mass to charge values of the reference set of elemental compositions;

grouping found differences according to expected mass accuracy;

selecting a correct group, where the selection of the correct group is based on: (i) the maximum number of entities in the group; and/or (ii) comparison of natural abundances of the sets of elemental compositions in groups; and adjusting one or more calibration parameters of a calibration routine so as to reduce the mass error between mass to charge ratios of the spectrum and the corresponding known precise mass to charge ratios of elemental compositions in the selected group.

9. A mass spectrometer as claimed in claim 8, wherein the mass spectrometer comprises a multi-reflecting Time of Flight mass analyser.

* * * * *